H. BLUMENBERG, Jr.
PROCESS OF PRODUCING POTASSIUM SULFATE.
APPLICATION FILED JAN. 2, 1918.
1,297,638.
Patented Mar. 18, 1919.
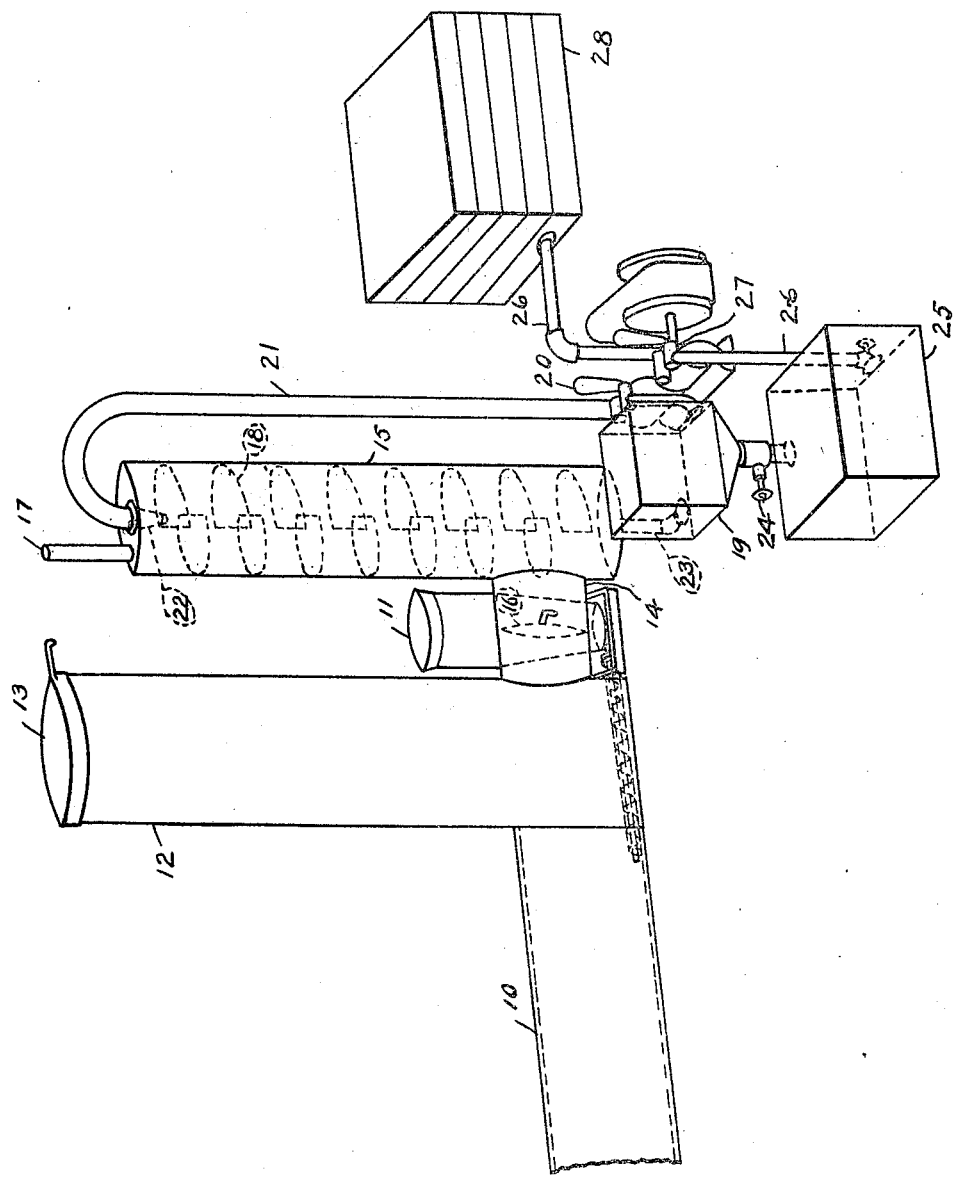
Inventor:
Henry Blumenberg, Jr.,
by Hazard & Miller
Att'ys.

UNITED STATES PATENT OFFICE.

HENRY BLUMENBERG, JR., OF LOS ANGELES, CALIFORNIA.

PROCESS OF PRODUCING POTASSIUM SULFATE.

1,297,638.

Specification of Letters Patent.   Patented Mar. 18, 1919.

Application filed January 2, 1918. Serial No. 209,979.

*To all whom it may concern:*

Be it known that I, HENRY BLUMENBERG, Jr., a citizen of the United States, residing at Los Angeles, in the county of Los Angeles and State of California, have invented new and useful Improvements in Processes of Producing Potassium Sulfate, of which the following is a specification.

My invention relates to a process of producing potassium sulfate direct from waste gases of cement kilns and the like which carry potassium compounds in suspension.

One source of supply of potassium salts is from hydraulic cement kilns which operate with materials containing potassium salts. The high temperature of the kiln volatilizes the potassium compounds which are carried off with the waste gases, mostly in the form of potassium oxid $K_2O$. It is the object of my invention to recover the potassium, carried in such gases, in the form of potassium sulfate, without the use of sulfuric acid which is expensive, and use in place thereof sulfates of the alkaline earth metals, preferably calcium sulfate.

My invention depends upon the fact that potassium oxid will, in the presence of water and carbon dioxid and under normal conditions of temperature and pressure, re-act with sulfates of the alkaline earth metal group to form potassium sulfate.

My invention consists in the steps of the process herein described and claimed.

In the accompanying drawings I have illustrated, by way of example, an apparatus suitable for carrying out my process.

In the drawings, 10 designates a portion of a cement kiln which is here shown to be of a rotary cylindrical type. 11 indicates a suitable apparatus whereby the raw material is fed into the stack end of the cement kiln 10. The waste gases enter the lower end of a stack or chimney 12 which, however, is only used when for any reason the potassium salts recovering apparatus hereinafter described is not in operation. 13 is a lid or damper normally closing the stack 12. 14 is a conduit for conveying the waste gases into a precipitating chamber or tower 15. 16 is a slide-valve whereby the conduit 14 may be closed. The tower 15 has an exit 17 at the top. A series of baffle plates 18, which are here shown arranged in staggered relation but which may be of any preferred construction, is provided in the interior of the tower 15. 19 is a tank from which, by means of a pump 20, a liquid may be pumped through pipe 21 to the top of the tower 15 and there sprayed by means of a nozzle 22. The liquid is retarded in its downward passage by the baffle plates 18 in the well-known manner, thereby allowing the same to become intimately mixed with the waste gases coming from the cement kiln 10. The liquid collecting at the bottom of the tower 15 is returned, by means of pipe 23, to the tank 19 which latter is provided with a valved outlet pipe 24 whence the liquid may be conveyed to an evaporating pan 25, which, by means of a valved pipe 26 and pump 27, is connected to a filter press 28 for separating the liquid from the solid constituents.

I mix ground calcium sulfate or gypsum with water to form a magma or slurry in the tank 19 and circulate the same by means of pump 20 and pipe 21 through the precipitating tower 15 where the slurry is caused to come in intimate contact with the cement kiln gases containing carbon dioxid, cement dust, and potassium oxid in suspension. The carbon dioxid in the presence of water forms calcium carbonate with the calcium oxid present in the cement kiln gases, also potassium carbonate with the potassium oxid. The calcium sulfate and the potassium carbonate react as indicated in the following equation:

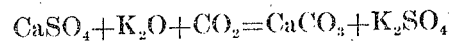
$$CaSO_4+K_2O+CO_2=CaCO_3+K_2SO_4$$

to form potassium sulfate and calcium carbonate. A great number of secondary reactions take place between the carbon dioxid and water and the silicates, etc., but do not interfere with the reaction stated. The magma is circulated through the tank 19 and precipitating tower 15 until sufficiently enriched with potassium sulfate, when it is drawn off to the evaporating tank 25 where the magma is evaporated to dryness to render the hydrous silicates insoluble. The mass is then treated with hot water and then pumped through the filter press 28 which separates the soluble salts from the insoluble residue. The filtrate contains potassium sulfate and is separated from other soluble salts, such as sodium salts which may be present, by the well-known process of crystallization.

In my co-pending application for a process of recovering potash from waste gases filed December 4, 1917, Serial No. 205,451, I have described the production of potassium carbonate by contacting the cement kiln gases with an alkaline aqueous mixture containing sodium potassium and aluminum silicates. Potassium carbonate is formed and the mixture containing potassium carbonate in the tank 25 is treated either before or after evaporation with calcium sulfate and heated to produce potassium sulfate which is afterward separated from the other ingredients of the mixture by filtration through the filter press 28 and subsequent crystallization.

When the calcium sulfate is mixed with the dried mass in the evaporating tank 25 it is necessary to heat the same in a furnace to effect the conversion of the potassium salts to potassium sulfate before treating the same with water.

It should be noted that in my process I use an inexpensive reagent, calcium sulfate, often available near cement kilns at a very low cost, and dispense with sulfuric acid which costs from thirty to forty dollars a ton. My process has another advantage over the sulfuric acid process, for the reason that the conversion is not so intense and not as great a quantity of gelatinous silicates is produced as when the solid products of the cement kiln gases are treated with sulfuric acid.

My process consists essentially in treating the cement kiln gases carrying potassium oxid as one of their constituents, with calcium sulfate, either acting directly thereon or on an intermediate product containing the potassium in the form of potassium carbonate, to produce potassium sulfate.

In place of the calcium sulfate or gypsum, other sulfates of the alkaline earth metal group may be used although calcium sulfate will, under normal conditions, be the most available as a commercial proposition.

Various changes in the steps of the process may be made by those skilled in the art without departing from the spirit of my invention as claimed.

I claim:

1. A process of producing potassium sulfate from waste gases containing potassium compounds in suspension and carbon dioxid, comprising contacting said gases with an aqueous mixture containing a sulfate of an alkaline earth metal, thereby forming potassium sulfate, and separating the potassium sulfate from the mixture.

2. A process of producing potassium sulfate from cement dust containing potassium compounds and comprising treating said mixture with a sulfate of an alkaline earth metal in the presence of water and carbon dioxid, thereby forming a mixture containing potassium sulfate, evaporating the mixture to dryness to render the silicates insoluble, treating the dehydrated mass with water, and separating the potassium sulfate from the mixture.

3. A process of producing potassium sulfate from waste gases containing carbon dioxid, cement dust, and potassium compounds, comprising treating said gases with an aqueous mixture of calcium sulfate, thereby forming potassium sulfate, and separating the potassium sulfate from the mixture.

4. A process of producing potassium sulfate from waste gases containing carbon dioxid, cement dust, and potassium compounds, comprising treating said gases with an aqueous mixture of calcium sulfate, thereby forming potassium sulfate, dehydrating the mixture to render the hydrous silicates insoluble, treating with water, and separating the potassium sulfate from the mixture.

In testimony whereof I have signed my name to this specification.

HENRY BLUMENBERG, Jr.